United States Patent [19]

Maule

[11] 4,254,879
[45] Mar. 10, 1981

[54] PHONOGRAPH RECORD HOLDER WITH LOCKING MEANS

[76] Inventor: Warren Maule, 345 Ford St., Highland Park, Mich. 48203

[21] Appl. No.: 932,230

[22] Filed: Aug. 9, 1978

[51] Int. Cl.³ ............................................. A47F 7/00
[52] U.S. Cl. .......................................... 211/4; 70/58; 211/40; 211/59.1; 211/64
[58] Field of Search ................. 211/4, 7, 8, 9, 23, 211/24, 40, 54.1, 57.1, 59.1, 64; 70/58, 59, 60, 61, 62; 206/303, 310; 224/45 K

[56] References Cited

U.S. PATENT DOCUMENTS

| | | | |
|---|---|---|---|
| 431,110 | 7/1890 | Driver | 211/4 X |
| 444,328 | 1/1891 | Boss | 206/303 X |
| 956,069 | 4/1910 | French | 211/59.1 |
| 1,598,277 | 8/1926 | Heppe | 211/40 |
| 2,278,214 | 3/1942 | Pearson | 211/40 |
| 3,027,012 | 3/1962 | Talmadge | 211/40 |
| 3,195,717 | 7/1965 | Senter | 206/303 |
| 3,266,688 | 8/1966 | Sefton | 211/59.1 X |
| 3,565,260 | 2/1971 | Stewart | 211/4 |
| 3,788,487 | 1/1974 | Dawson | 211/59.1 X |
| 4,128,175 | 12/1978 | Schwizer | 211/40 |

FOREIGN PATENT DOCUMENTS 595957  2/1978  Switzerland .............................. 211/24

*Primary Examiner*—Thomas J. Holko
*Attorney, Agent, or Firm*—Gifford, Van Ophem, Sheridan & Sprinkle

[57] ABSTRACT

A unique phonograph record holder is provided with locking means to prevent the unauthorized removal of phonogrph records from the holder. The record holder comprises an elongated support which is maintained in a vertical and elevated position by either a stand or by securing the support to a wall. A first and second elongated rod extend perpendicularly outwardly from the support so that the rods are horizontal and in a spaced and parallel relationship. Phonograph records having a central aperture are then positioned over one of the elongated rods so that the rod extends through the record aperture. A locking link is detachably secured across the free ends of the rods to prevent the unauthorized removal of phonograph records from the holder.

7 Claims, 4 Drawing Figures

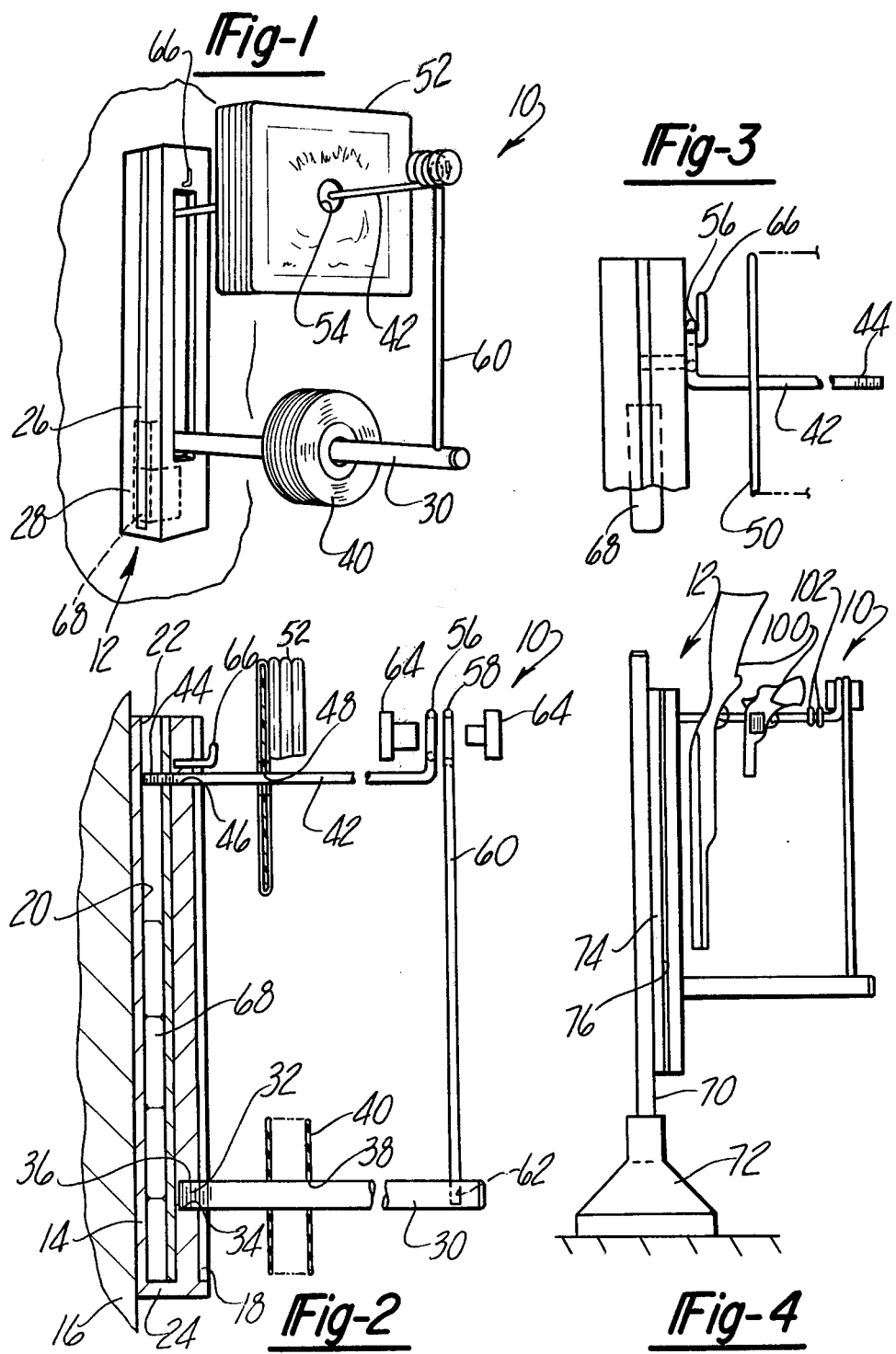

PHONOGRAPH RECORD HOLDER WITH LOCKING MEANS

BACKGROUND OF THE INVENTION

I. Field of the Invention

The present invention relates generally to phonograph record holders and, more particularly, to such a holder with locking means to prevent the unauthorized removal of phonograph records.

II. Description of the Prior Art

There are a number of previously known phonograph record holders for both holding and displaying phonograph records. While many of these previously known record holders merely comprise a closure having partitions between which one or more phonograph records are received, other types of previously known phonograph record holders employ a rod which extends through the central aperture of the phonograph records as the holding mechanism.

One example of this latter type of record holder is disclosed in U.S. Pat. No. 2,278,214 which issued on Mar. 31, 1942 to H. B. Pearson. This type of record holder which supports the records by a rod extending through the central aperture is advantageous in that it prevents warpage of the records which can occur when the records are stacked and leaned against each other. For a number or different reasons, however, this type of previously known record holder has not enjoyed widespread acceptance or use.

One disadvantage of this type of record holder is that such record holders have heretofore been employed only for use in conjunction with records which are typically stored without record jackets, i. e. 45 rpm records. Conversely, records which are typically stored in jackets, i. e. long playing albums, could not be used with such record holders. Presently, however, long playing albums have enjoyed increased popularity but, due to their high cost, storage of such records without their record jackets has been an economic impracticality.

A still further disadvantage of these previously known record holders in which a rod extends through the central aperture of the record is that there has previously been no provision for simply, but effectively, preventing the unauthorized removal of the record from the record holder. As a result unauthorized persons, such as children, unscrupulous adults and burglars can simply and readily remove the records from the record holder.

SUMMARY OF THE PRESENT INVENTION

The present invention overcomes the above-mentioned disadvantages of the previously known record holders by providing a record holder of the type having a rod which extends through the central aperture of a plurality of records and with locking means to prevent the unauthorized removal of records from the record holder.

In brief, the record holder of the present invention comprises an elongated upright support which is maintained in a vertical and elevated position by either a stand or by connecting the upright supprot to a wall of a dwelling. A first and a second rod are secured at one end to the upright support and extend perpendicularly outwardly, and thus horizontally, therefrom and in a spaced and parallel relationship with each other. One rod is dimensioned to fit through the relatively small aperture of a long playing record while, conversely, the second rod is dimensioned to fit through the central aperture of a single play or 45 rpm record.

With the phonograph records positioned over their respective rod, a locking device is provided to prevent the unauthorized removal of the records from the record holder. In the prefered form of the invention, a link is slidably received through an aperture at the free end of one rod and detachably connected to the free end of the other rod by means of a conventional key or combination operated lock.

Preferably, an elongated channel is formed through the upright support for receiving a plurality of stacked tape cassettes or cartridges. In addition one of the rods can be selectively positioned laterally across the channel near its upper end to prevent the unauthorized removal of the taped cartridges or cassettes from the upright support.

BRIEF DESCRIPTION OF THE DRAWINGS

A better understanding of the present invention will be had upon reference to the following detailed description when read in conjunction with the accompanying drawing, wherein like reference characters refer to like parts throughout the several views, and in which:

FIG. 1 is a perspective view illustrating the phonograph record holder according to the present invention;

FIG. 2 is a side sectional view illustrating the record holder according to the present invention;

FIG. 3 is a fragmentary side elevation view showing a portion of the record holder according to the present invention and enlarged for clarity; and FIG. 4 is a side elevational view showing a modification of the record holder according to the present invention.

DETAILED DESCRIPTION OF THE PRESENT INVENTION

With reference first to FIGS. 1 and 2, the phonograph record holder 10 according to the present invention is thereshown and comprises an elongated upright support 12 having a generally rectangular shape. One side 14 of the upright support 12 is secured to a wall 16 of a dwelling or other building construction by conventional means not shown so that the opposite side 18 of the upright support 12 faces outwardly from the wall 16 and is oriented substantially vertically. A vertically extending channel 20 is also formed longitudinally through the upright support 12 which is open at the top 22 of the support 12 but closed at the bottom 24. A vertically extending slot 26 is also formed along one lateral side 28 of the upright support 12 which is open to but smaller than the channel 20.

A first elongated rod 30 is secured to the front face 18 of the upright support 12 so that the rod 30 extends perpendicularly outwardly from the upright support 12 and in a substantially horizontal direction. Any suitable means can be employed to secure the inner end 32 of the rod 30 to the upright support 12 such as external threads 34 on the rod 30 which threadably engage an internally threaded bore 36 in the upright support 12. In addition, the rod 30 is dimensioned to fit through the central aperture 38 of a single play, i. e. a 45 rpm, record 40.

A second elongated rod 42 includes external threads 44 at one end which threadably engage a threaded bore 46 in the front face 18 of the upright support 12. The rod 42 also extends perpendicularly outwardly from the upright support 12 and is generally parallel to but spaced upwardly from the first rod 30. In addition, the threaded end of the rod 42 preferably extends into and laterally across the channel 20 in the upright support 12 for a reason to be hereinafter described.

The rod 42 is dimensioned to fit through the relatively small aperture 48 of a long playing album 50. Since long playing albums 50 are typically stored with a record jacket 52 to protect them from dust, a hole 54 is first punched or otherwise formed through the album jacket 52. Preferably, the hole 54 is larger than the diameter of the rod 42 in order to facilitate the positioning of the long playing records 50 over the rod 42.

A loop 56 is formed at the free end of the rod 42 which generally lies in a radial plane with respect to the axis of the rod 42. The loop 56 registers with a similar loop 58 formed at one end of an elongated locking link 60 while the other end of the link 60 is slidably received through an aperture 62 at the free end of the first rod 30. The loops 56 and 58 can be detachably secured together by a conventional key or combination operated lock 64 which simply, but effectively, prevents removal of the records 40 or 50 from the holding rods 42 and/or 30.

When removal of one record 40 or 50 from the record holder 10 of the present invention is desired, the lock 64 is first removed thus freeing the loops 56 and 58 from each other after which the link 60 is removed from the first rod 30. The second rod 42 is then unscrewed from the upright support 12 until the rod 42 is entirely free of the upright support 12. The rod 42 with the albums positioned thereover is then rotated end to end and the loop 56 is positioned over a hook 66 secured to the front face 18 of the upright support 12 as is best shown in FIG. 3. The long playing records 50 can then be removed from the rod 42 over the threaded end 44, as shown in phantom line in FIG. 3, while, simultaneously, the single play records 40 can be removed across the free end of the first rod 30.

With reference now particularly to FIGS. 1 and 2, the vertical channel 20 through the upright support 12 is dimensioned to recieve a plurality of stacked tape cartridges or cassettes 68. The slot 26 along the side face 28 of the upright support 12 permits access to the channel 20 so that the cartridges 68 can be removed through the open top 22 of the channel 20 upon the insertion and upper movement of a pencil or similarly shaped implement. In addition, the extension of the threaded end 44 of the second rod 42 laterally across the channel 20 locks the cartridges 68 within the channel 20 and prevents the unauthorized removal from the channel 20.

With reference now to FIG. 4, a modification of the phonograph record holder 10 according to the present invention is thereshown in which the upright support 12 comprises a vertically extending shank 70 secured to a movable base 72 at its lower end. Thus, unlike the record holder 10 depicted in FIGS. 1-3, the modification of the invention shown in FIG. 4 is free standing and thus can be positioned in any desired location within a room of a building construction. A tape cartridge or cassette dispenser 74 can also be secured to the shank 70 and, like before, includes a cartridge or cassette receiving channel open at the top and accessible through an elongated slot 76 along the dispenser 74. The threaded end of the second rod 42 also preferably extends laterally across the vertical channel formed through the dispenser 74 in order to prevent the unauthorized removal of tape cassettes or cartridges from the dispenser 74.

From the foregoing, it can be seen that the record holder according to the present invention provides a simple and inexpensive means whereby unauthorized removal of the records from the record holder is effectively prevented. Moreover, the record holder of the present invention can accommodate single play and long playing records by simply punching or otherwise forming a central hole through the record jacket. Additionally, since the record holder 10 according to the present invention supports the records at their central aperture, the holder effectively prevents warpage of the record previously caused by records leaning against each other.

The record holder 10 according to the present invention is further advantageous in that tape cassettes and/or cartridges can be conveniently stored and locked within the upright support of the device. As such, the holder 10 provides a convenient storage and security device for recording media of a plurality of different types of home entertainment equipment. It will also be understood that other types of valuables, such as guns 100, rings 102 (FIG. 4) and the like, can also be positioned around one of the rods to prevent their unauthorized removal from the holder 10.

Having described my invention, however, many modifications thereto will become apparent to those skilled in the art to which it pertains without deviation from the spirit of the invention as defined by the scope of the appended claims.

I claim:

1. Apparatus for holding phonograph records, each record having a central aperture, said apparatus comprising:
    an elongated support member and means for maintaining said support member in a vertical position;
    a first elongated rod, said first rod having one end secured to said support member so that said rod extends substantially horizontally outwardly from said support member;
    a second elongated rod, said second rod having one end secured to said support member so that said second rod extends substantially horizontally outwardly from said support member and in a spaced and parallel relationship to the first rod; and
    means to prevent unauthorized access to phonograph records positioned over either of said rods comprising, a locking member and means for detachably connecting said locking member to the other ends of said first and second rods;
    wherein the one end of the first rod is detachably connected to said support member and means formed on the other end of said first rod for detachable connection with the support member.

2. The invention as defined in claim 1 wherein said first rod is dimensioned to fit through the central aperture of a long playing album while the second rod is dimensioned to fit through the central aperture of a 45 rpm record.

3. The invention so defined in claim 1 wherein said last mentioned means comprises a loop formed on said first rod and engageable over a hook secured to said support member.

4. The invention as defined in claim 3 wherein said detachably connecting means comprises an elongated link having a loop at one end which registers with said first rod loop, the other end of said link being received in an aperture formed in said second rod and said locking member securing said registering loops together.

5. The invention as defined in claim 1 wherein said support member includes a central channel closed at the bottom and open at the top into which magnet tape devices are slidably received.

6. The invention as defined in claim 5 wherein the one end of the first rod extends across the support member channel to prevent the unauthorized removal of the tape devices therefrom.

7. The invention as defined in claim 1 wherein said maintaining means comprises a movable support stand.

* * * * *

UNITED STATES PATENT AND TRADEMARK OFFICE
CERTIFICATE OF CORRECTION

PATENT NO. : 4,254,879

DATED : March 10, 1981

INVENTOR(S) : Warren Maule

It is certified that error appears in the above-identified patent and that said Letters Patent are hereby corrected as shown below:

Column 2, line 7, delete "prefered" and insert --preferred-- therefor.

Signed and Sealed this

Twenty-sixth Day of May 1981

[SEAL]

Attest:

Attesting Officer

RENE D. TEGTMEYER

Acting Commissioner of Patents and Trademarks